Inventor
ROBIN GORE REES

By Kurt Kelman
AGENT

Inventor
Robin Gore Rees
By Kurt Kelman
AGENT

United States Patent Office 3,447,211
Patented June 3, 1969

3,447,211
SKIRT FRINGING APPARATUS
Robin Gore Rees, Dublin, Ireland, assignor to Desmond Martin Forde, Blackrock, Ireland
Filed July 18, 1967, Ser. No. 654,239
Claims priority, application Ireland, July 20, 1966, 810/66
Int. Cl. D06c 23/02; D04d 7/08
U.S. Cl. 28—18                                        8 Claims

ABSTRACT OF THE DISCLOSURE

A skirt fringing apparatus having a support and associated clamp for locating material on the support, a rotatable brush carrying drum borne by carriage members slidable on guides to bring the rotatable brushes into contact with material clamped on the support, an electric motor suspended beneath and movable with the drum, and a simple lever system for moving the guided carriage member towards the support.

---

This invention relates to an apparatus for the production of a teased fringe on a piece of woven material and the invention is particularly concerned with the manufacture of wearing apparel such as skirts.

Fringing operations are normally carried out manually, an operator removing the weft threads individually to a cloth depth of up to one and a half inches. Conventional fringing methods are thus tedious and time consuming and considerably increase the cost of producing a fringed garment.

An object of the present invention is to mitigate the foregoing disadvantages by providing an apparatus for automatically producing a teased fringe on woven cloth.

The invention accordingly provides apparatus for the production of a teased fringe on a piece of woven material, said apparatus comprising an elongated support, means for clamping material to be fringed on said support, rotating brushes movable relative to said support for acting upon material clamped in said support to remove weft threads from said material without causing damage to the warp threads in said material, the weft threads being progressively removed from the free edge of said material towards the clamped edge thereof, and means for rotating said brushes.

Preferably, the rotatable brushes are mounted upon a slidable support adapted to be moved into a position in which said brushes are adapted to act upon material clamped in said support.

The material support is advantageously provided with a flat portion formed with rounded serrations and adapted to co-operate with a similarly serrated clamping member or bar capable of being operated to secure woven material between the clamping bar and the flat portion of the support, the latter also having a downwardly sloping metal surface upon which material to be fringed is adapted to lie. Preferably, the sloping metal surface is an integral part of the support, the flat portion thereof being joined to the sloping surface by a curved portion.

Figure 1:
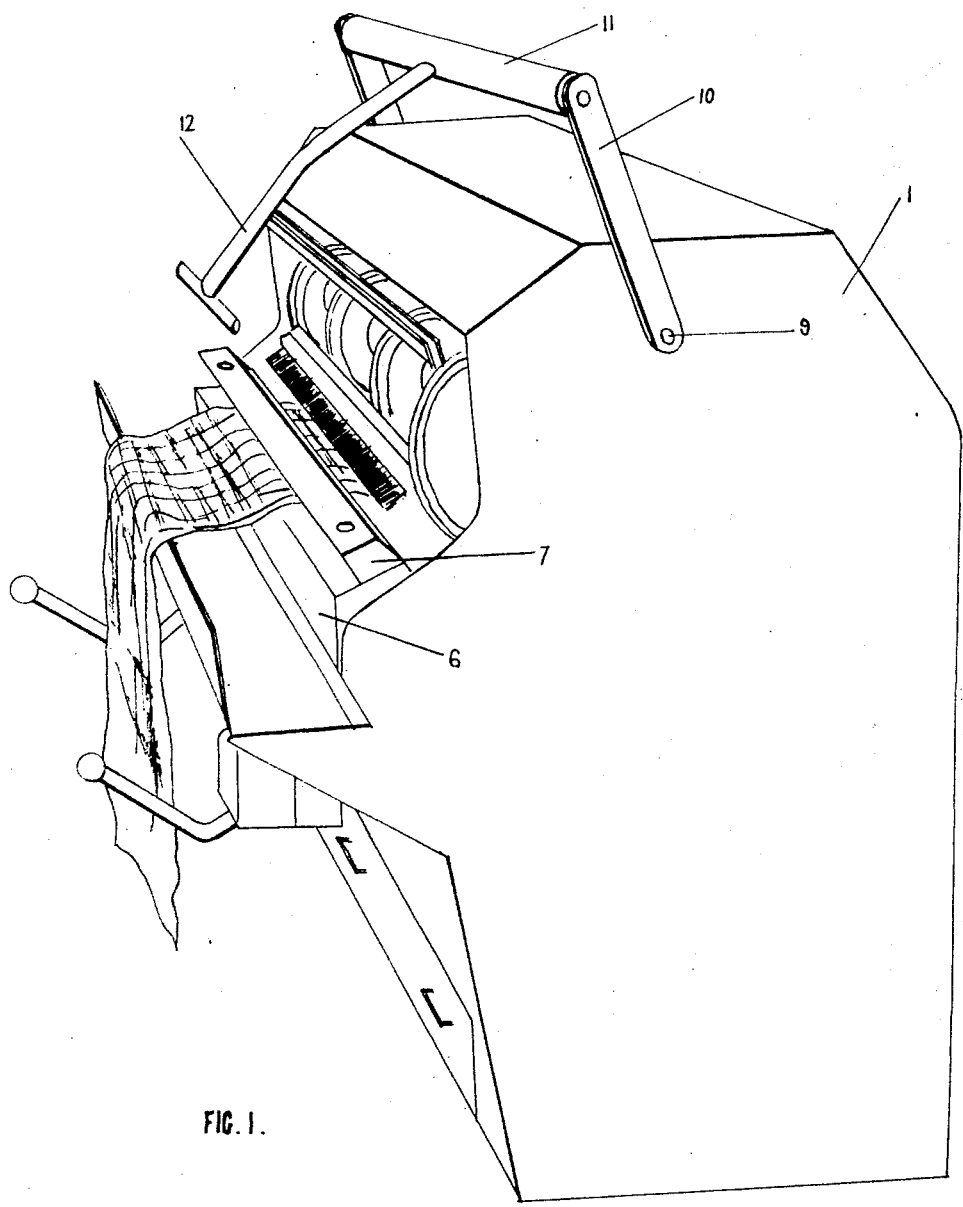
Figure 2:
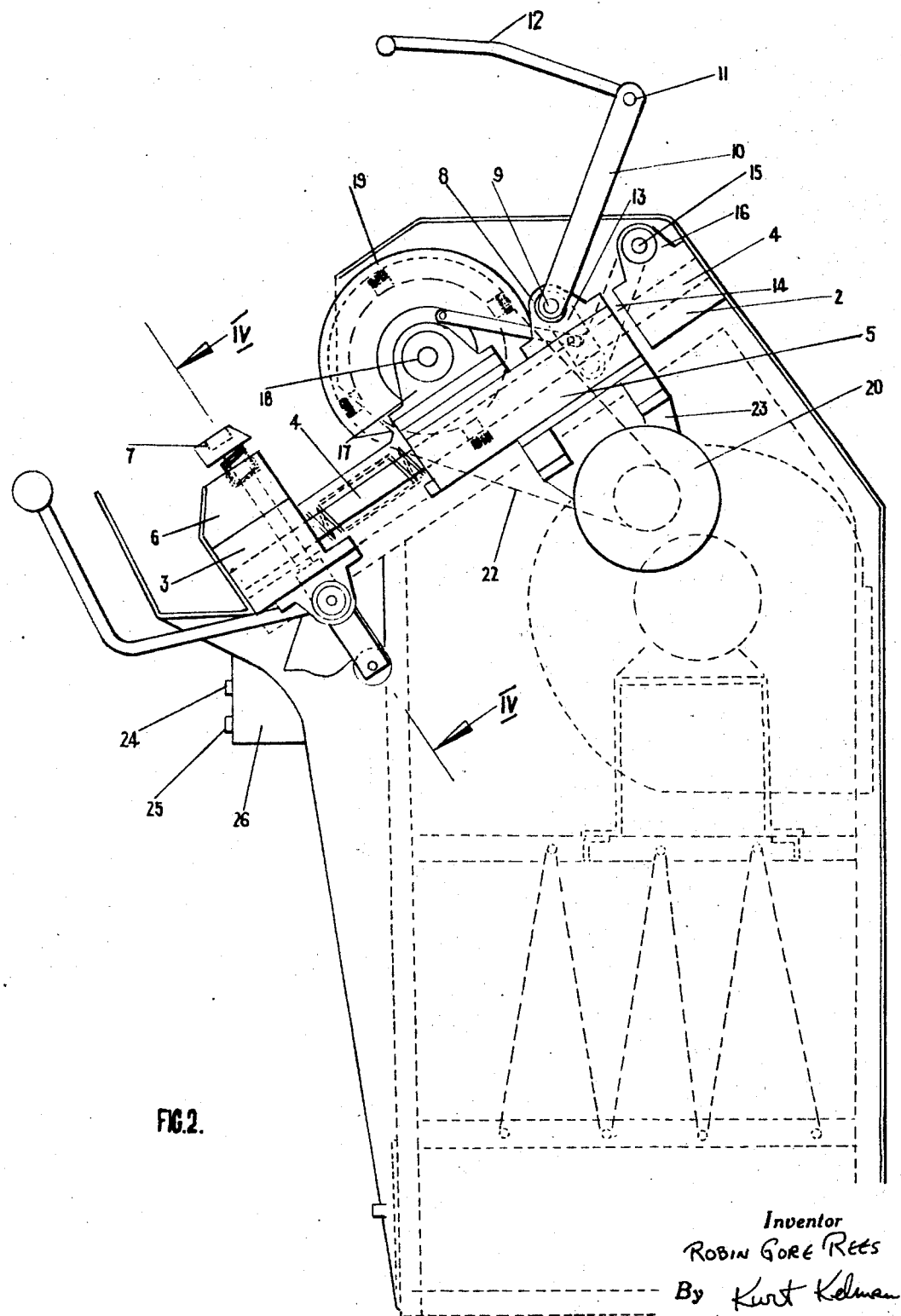
Figure 3:
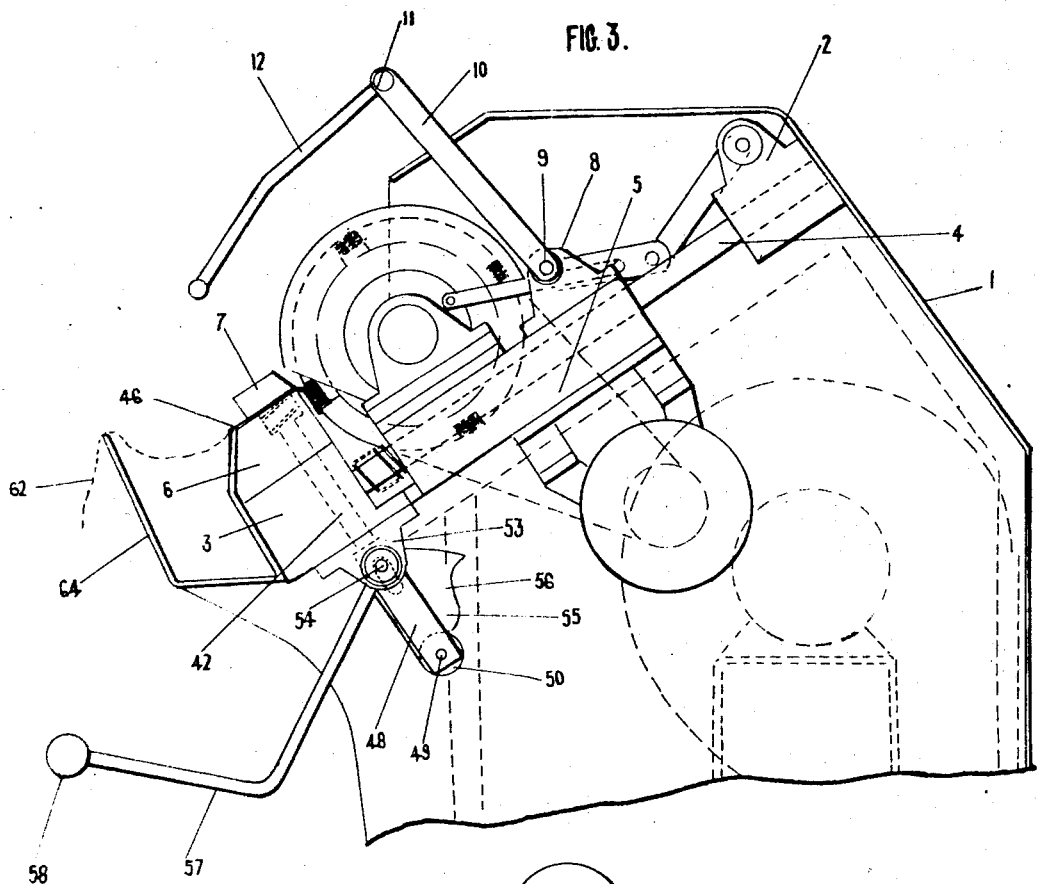
Figure 4:
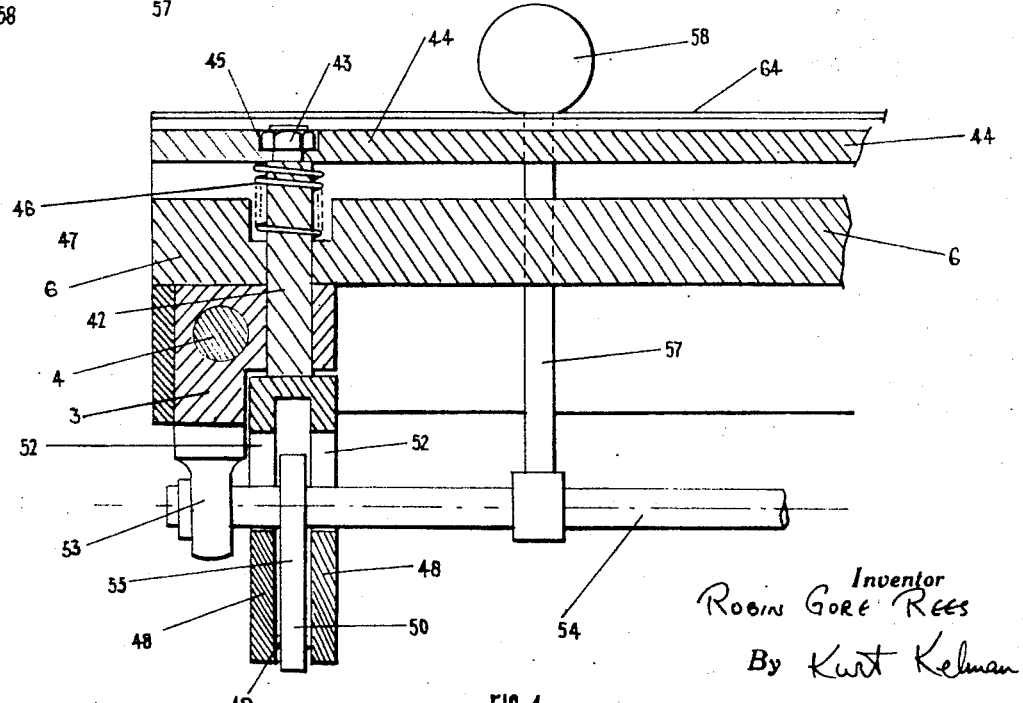
Figure 6:
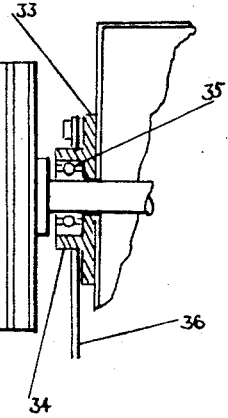
Figure 5:
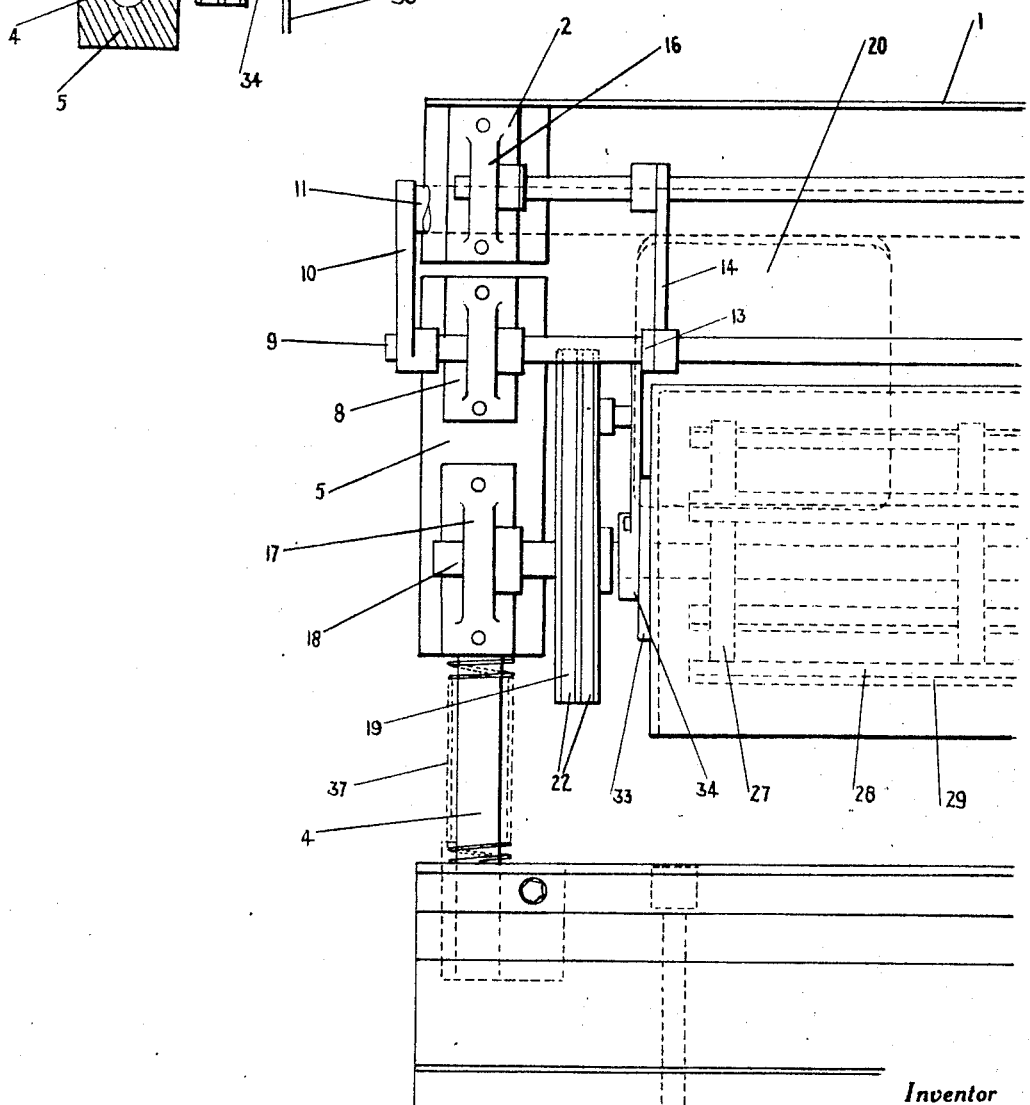
Figure 5A:
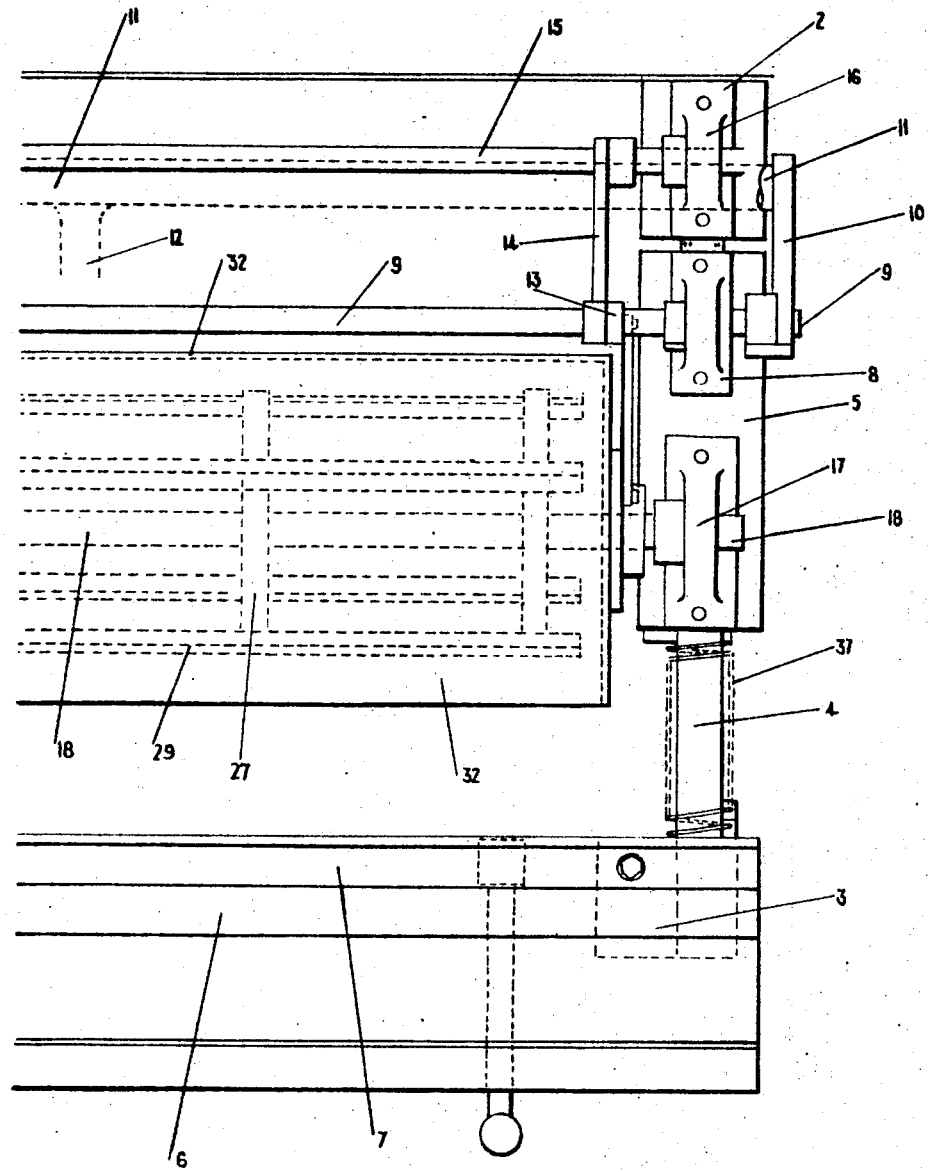

The invention will hereinafter be described more particularly with reference to the accompanying drawings which illustrate, by way of example, a preferred embodiment thereof, and wherein:

FIGURE 1 is a perspective view of a skirt fringing machine according to the invention, FIGURE 2 is a side elevation of the machine in its rest position with the side wall thereof removed, FIGURE 3 is an enlarged side elevation of portion of the machine showing the latter in its operative position, FIGURE 4 is a sectional view on the lines IV—IV of FIGURE 2, FIGURE 5 is a view of the left hand side of FIGURE 2 looking in the direction of arrow X, FIGURE 5A is a view of the right-hand-side of FIGURE 2 looking in the direction of arrow X and, FIGURE 6 shows a detail, partly in section, of FIGURE 5.

Referring to the drawings, the skirt fringing apparatus comprises a housing 1 supporting a pair of spaced inclined anchor members 2. Between each of the anchor members 2 and between each of a further pair of spaced anchor members 3, supported in the housing 1, is an inclined guide bar 4, the two guide bars 4 being disposed in spaced parallel relationship. Upon each guide bar 4 is a movable carriage member 5, the pair of carrier members 5 supporting between them a rotatably brush assembly and associated mechanism, the details of which will be described hereinafter. Supported by the anchor members 3 is a longitudinal support 6 operatively associated with a clamping bar 7.

Mounted on each of the carriage members 5 is a bracket 8 and between the pair of brackets 8 is rotatably mounted a shaft 9 on the extreme ends of which are rigidly connected one end of a pair of operating levers 10, the other ends of which are rigidly connected to a cross-bar 11, having intermediate its ends, a handle lever 12. Between the extreme ends of the shaft 9 are rigidly mounted in spaced relation one end of each of a pair of operating arms 13, the other ends of which are pivotally connected to a pair of operating links 14, the remote ends of the operating links 14 being rigidly connected to a shaft 15 rotatable in brackets 16 mounted upon the spaced anchor blocks 2.

Also mounted upon each of the carriage members 5 is a further bracket 17 and between the brackets 17 is mounted an assembly comprising a rotatable shaft 18 on which is rigidly mounted a pulley 19 operatively coupled to an electric motor 20 by means of drive belts 22, the electric motor 20 being suspended beneath the assembly by a pair of support arms 23. The terminals (not shown) of the electric motor 20 are connected to stop and start switches 24 and 25 respectively located in a switch casing 26 (FIGURE 2).

The rotatably mounted shaft 18 carries four equally spaced discs 27 (see FIGURE 5) bridging the peripheries of which are secured elongated circumferentially spaced wire brushes 28, the bristles 29 of which are located in wooden bases 31 and project in a radial direction relative to the shaft axis 18. A partly cylindrical guard 32 covers the brushes 28 in a position indicated in FIGURE 2. The guard 32 is supported by means of a pair of end plates 33 each of which is integral with a collar 34 containing a ball race 35 (see FIGURE 6) through the intermediary of which the end plates 33 are rotatably mounted upon the shaft 18. Pivotally connected to each end plate 33 is one end of a guard tilting link 36, the other ends of which are pivotally connected to the operating arms 13.

In the inoperative position (FIGURE 2) of the skirt fringing machine, the movable assembly and associated mechanism is displaced from the support 6 by a pair of springs 37, one of which is disposed on each of the guide bars 4.

Slidably mounted within and perpendicular to the support 6 is a pair of spaced parallel rods 42 to one end of which is secured, by means of a nut 43, the longitudinal clamping bar 7 (see FIGURE 4), each rod 42 passing through co-aligned apertures in each of the anchor blocks 3 and in the support 6.

Coiled upon each rod 42 is a spring 46 compressed between the longitudinal clamping bar 7 and the support 6, the spring 46 being disposed in a cylindrical recess 47 provided in the longitudinal support 3. The remote end of each rod 42 is forked to provide a pair of prongs 48, the free ends of which are joined by a spindle 49 carrying a wheel 50. Each prong 48 has a slot 52.

The anchor blocks 3, which are located beneath the longitudinal support 6, are each provided with a depending bracket 53 between which is rotatably supported a shaft 54.

Rigidly mounted upon and adjacent opposite ends of the shaft 54 is a pair of cams 55, each of which has an operating surface 56 which bears upon one of the wheels 48. The shaft 54 is rigidly connected to a pair of clamp operating levers 57 each of which has a handle 58.

When it is desired to operate the machine to fringe a skirt, a length of skirt material 62 is positioned over the longitudinal support 6 so that the portion 63 of the skirt material 62 to be fringed projects downwardly into the machine as shown in FIGURES 1 and 3 of the accompanying drawings, the bulk of the skirt material 62 lying upon a skirt support member 64 and the clamping bar 7 being in the positions shown in FIGURES 2 and 4. The skirt material 62 can then be clamped in the position described above by depressing the handles 58 associated with the clamp operating levers 57.

Downward movement of the operating levers 57 transmits rotary motion to the shaft 54 and moves the cams 55 so that the operating surfaces 56 of the coms 55 exert downward pressure upon the wheels 50 pulling downwardly the prongs 48 and associated rods 42. Downward motion of the rods 42 is imparted to the longitudinal clamping bar 7 which secures the skirt material 62 in the desired position as shown in FIGURE 3.

If not running, the electric motor 19 is started by depression of start button 25, the movable assembly and associated mechanism being in the position shown in FIGURE 2. When the brushes 28 are rotating at the required speed following starting of the electric motor 20, the operating handle 12 is moved downwardly in the direction of the support 6. Downward movement of the operating handle 12 causes the operating levers 10 to pivot about the shaft 9 and to rotate the operating arms 13, the latter thrusting against the operating links 14 and thereby causing the carriage members 5 to move donwwardly along the guide bars 4 towards the support 6, the rotating brushes 28 being thereby brought into contact with the portion 63 of the material 62 to be fringed, the weft threads in the free edge of the material 63 being loosened and removed before the brushes 28 are brought into contact with the remainder of the material 63 to be fringed.

When the carriage members 5 move towards the support 6, the operating arms 13 exert a restraining force upon the guard tilting links 36 which thereby partly open the guard 32 to enable the brushes 28 to act upon the portion 63 of material clamped on the support 6 (see FIGURE 3).

Threads removed from the fringed material 63 drop into a removable bin 61 located in the bottom of the housing 1, while dust created in the housing 1 is drawn into dust collection bags 65 by a fan 66 operated by the electric motor 20, the dust collection bags 65 being detachably suspended from a support 67.

In the preferred embodiment described above, the bristles of each of the four brushes are 1.375 of an inch in length and 0.015 of an inch in diameter. Each bristle is manufactured from stainless steel and each of the four brushes has three rows of tufts each containing 25 to 30 bristles set in a diamond pattern into a hardwood backing. The protruding length of each bristle in each brush is approximately 1.5 inches. When the bristles are arranged in the formation described and have the dimensions and character specified, a preferred speed of rotation is 280 revolutions per minute. It will be appreciated, however, that the character and dimensions of the bristles may be varied to suit particular applications without departing from the invention.

What is claimed is:

1. Apparatus for producing a teased fringe on a piece of woven material comprising an elongated stationary support, means for clamping material to be fringed on said support, brush carriage means movable relative to said support, rotatable brushes on said carriage means for removing weft threads from material clamped on said support, guide means for moving the carriage means into a position in which said brushes are adapted to act on material clamped in said support, means for rotating said brushes, and means for causing relative movement between said carriage means and said support.

2. Apparatus as claimed in claim 1, in which said support is located at an obtuse angle to the path of movement of said carriage means.

3. Apparatus as claimed in claim 2, including a drum rotatably mounted between a pair of carriage members slidably movable on said guide means, four longitudinal brushes mounted lengthwise and spaced circumferentially on the periphery of said drum.

4. Apparatus as claimed in claim 3, including anchor means disposed in proximity to said guide means on the side of said carriage members remote from said support, lever means operatively connected between said carriage members and said anchor means for causing said carriage members to slide on said guide means in a direction away from said anchor means.

5. Apparatus according to claim 4, in which said support has a flat portion for receiving said clamp means, said flat portion having rounded serrations thereon adapted to co-operate with rounded serrations on the underneath of a clamping bar included in said clamp means, a rounded shoulder integral with said flat portion of said support and a downwardly sloping metal surface integral with said shoulder.

6. Apparatus as claimed in claim 5, in which said clamping bar is movable in response to a pair of guide rods, abutment means on said guide rods, and cam means operable upon said abutment means for causing said clamping bar to contact said flat portion of said support.

7. Apparatus as claimed in claim 6, including an electric motor for rotating said drum, said electric motor being suspended beneath and movable with said drum.

8. Apparatus as claimed in claim 7, including a partly cylindrical guard for said brush carrying drum, and means for withdrawing said guard when said brushes are in proximity to said support.

References Cited

UNITED STATES PATENTS

| 3,128,526 | 4/1964 | Plastock | 28—18 |
| 3,195,216 | 7/1965 | Polakoff | 28—18 |
| 3,279,026 | 10/1966 | Strauss et al. | 28—18 |

LOUIS K. RIMRODT, *Primary Examiner.*